(12) United States Patent
Walters, Jr.

(10) Patent No.: US 7,343,649 B2
(45) Date of Patent: Mar. 18, 2008

(54) GREASE GUN HANDLE RESTRAINER

(76) Inventor: Carl Walters, Jr., HC34 Box 217, New Castle, VA (US) 24127

( * ) Notice: Subject to any disclaimer, the term of this patent is extended or adjusted under 35 U.S.C. 154(b) by 297 days.

(21) Appl. No.: 10/999,669

(22) Filed: Nov. 30, 2004

(65) Prior Publication Data

US 2005/0156128 A1    Jul. 21, 2005

Related U.S. Application Data

(60) Provisional application No. 60/534,459, filed on Jan. 6, 2004.

(51) Int. Cl.
*A44B 21/00* (2006.01)
(52) U.S. Cl. ............... 24/298; 224/250; 24/302
(58) Field of Classification Search ........... 24/298, 24/300, 301, 302, 464, 465, 478, 3.13, 3.1, 24/306; 224/250, 255, 901.2, 901.4, 901.6, 224/901.8
See application file for complete search history.

(56) References Cited

U.S. PATENT DOCUMENTS

| | | | | |
|---|---|---|---|---|
| 2,669,231 A | * | 2/1954 | Fisher | ............ 604/179 |
| 3,160,158 A | * | 12/1964 | Rayhart | ............ 604/179 |
| 4,874,151 A | | 10/1989 | Fritz | |
| 4,982,885 A | * | 1/1991 | Severson et al. | ........... 224/675 |
| 5,042,113 A | * | 8/1991 | Severson et al. | ......... 24/16 PB |
| 5,347,913 A | | 9/1994 | Stepner | |
| 5,794,313 A | | 8/1998 | Parsons | |
| 5,868,369 A | * | 2/1999 | Montgomery | ............ 248/214 |
| 5,920,965 A | | 7/1999 | Kleban | |
| 5,964,386 A | * | 10/1999 | Cote | ............ 224/250 |
| 6,298,524 B1 | | 10/2001 | Officer | |
| 2002/0092135 A1 | | 7/2002 | Mancini et al. | |
| 2002/0104202 A1 | | 8/2002 | Henry et al. | |

* cited by examiner

*Primary Examiner*—Robert J. Sandy
(74) *Attorney, Agent, or Firm*—DeWitt Ross & Stevens S.C.; Charles S. Sara

(57) ABSTRACT

A strap having fasteners for securing the handle of a grease gun in the closed position has a first loop for wrapping around the barrel of a grease gun and a second loop for wrapping around the grease gun handle in the flexed position.

7 Claims, 10 Drawing Sheets

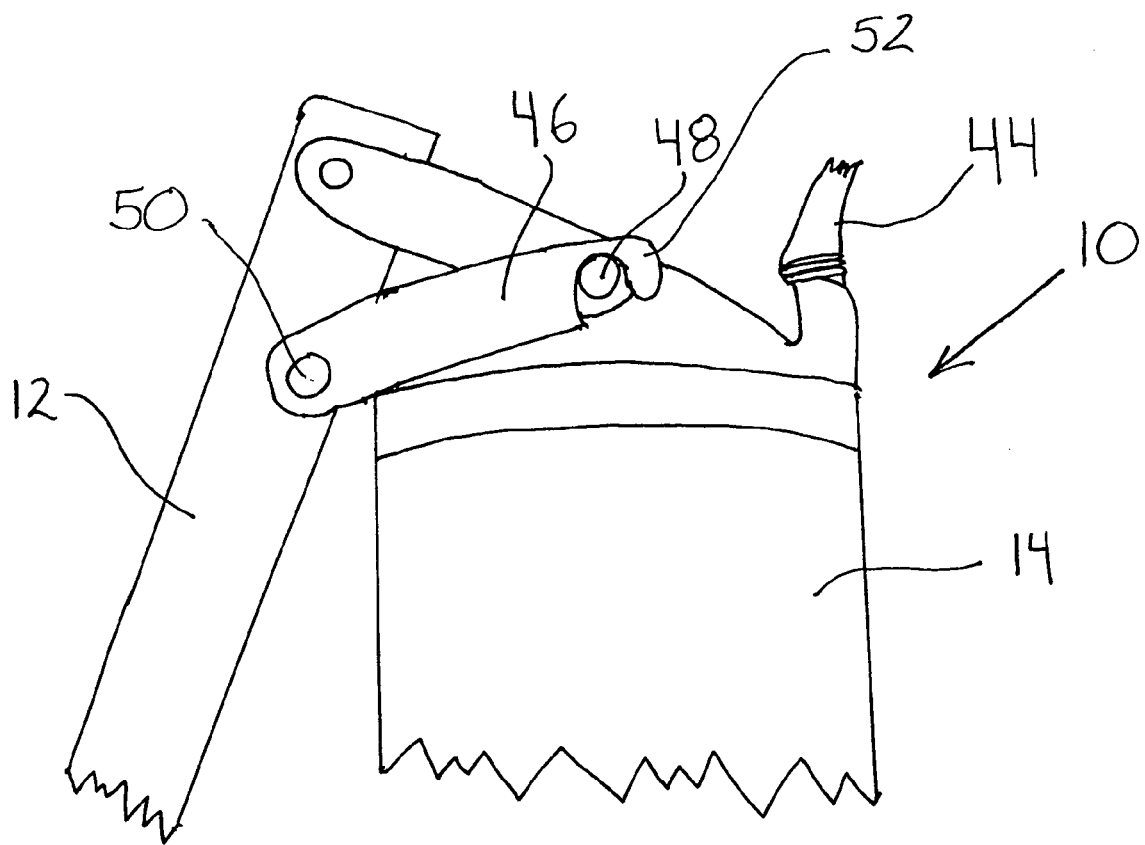

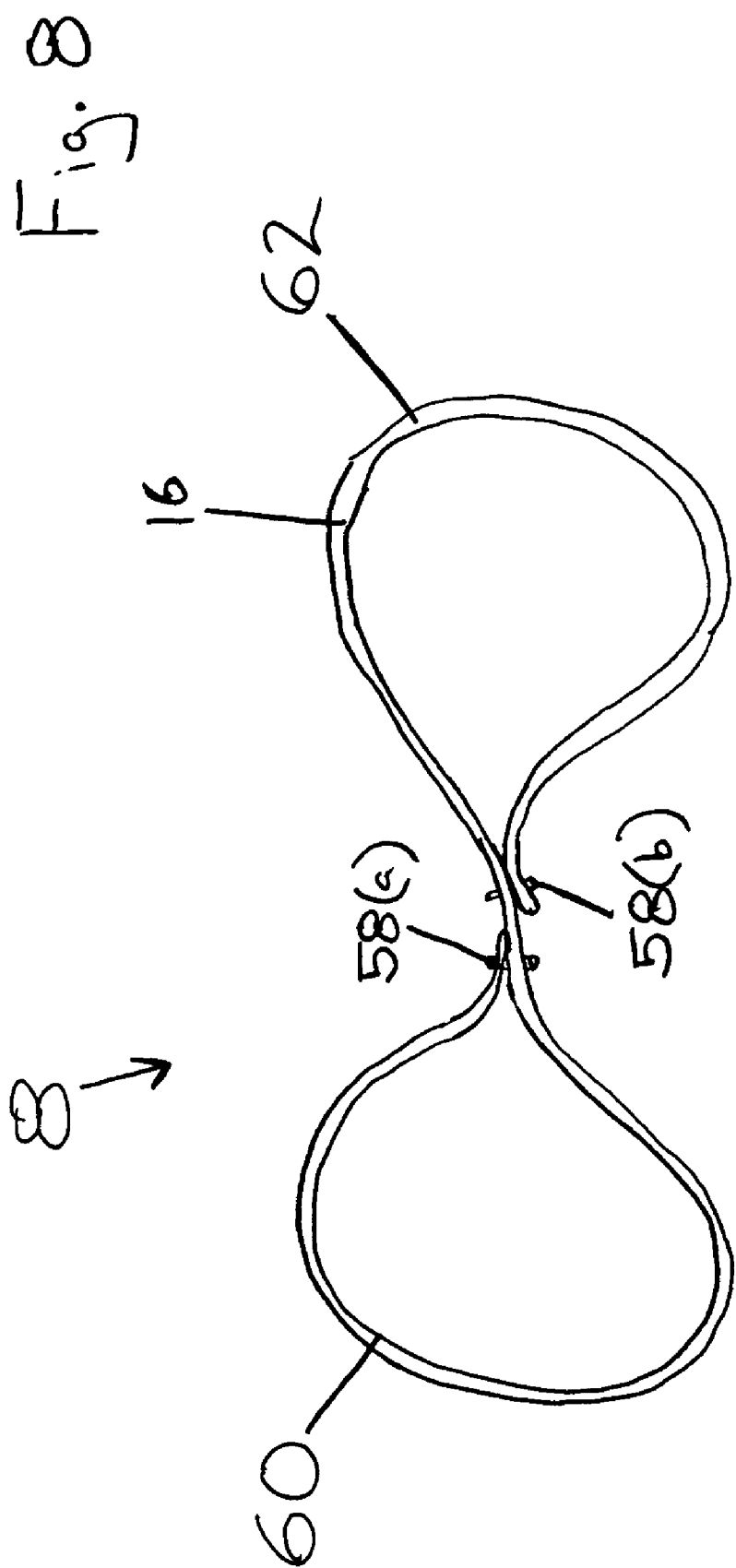

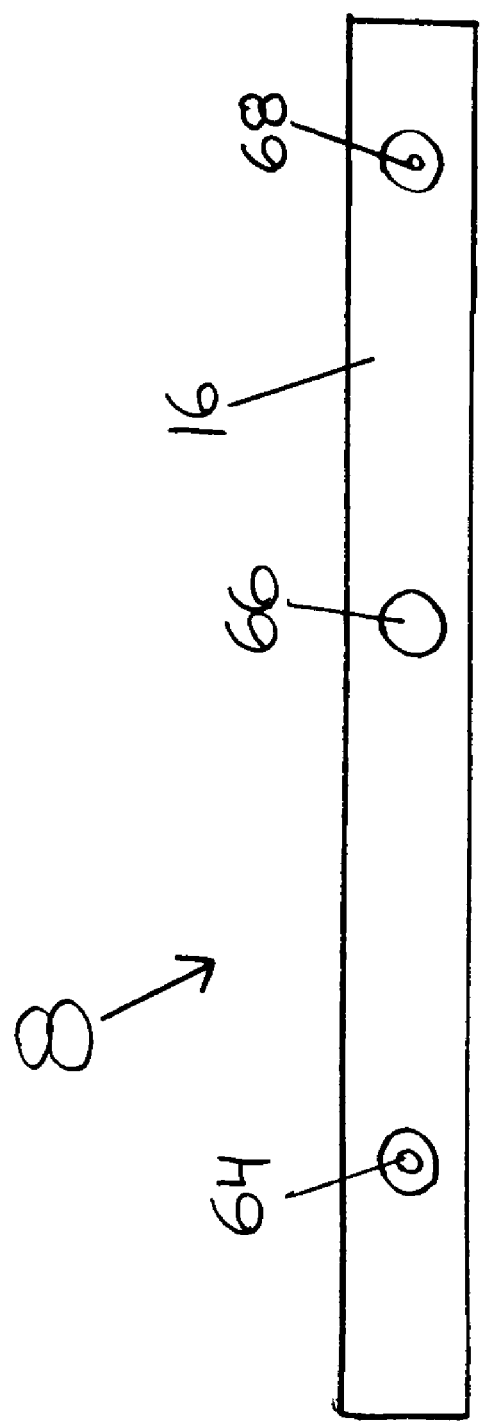

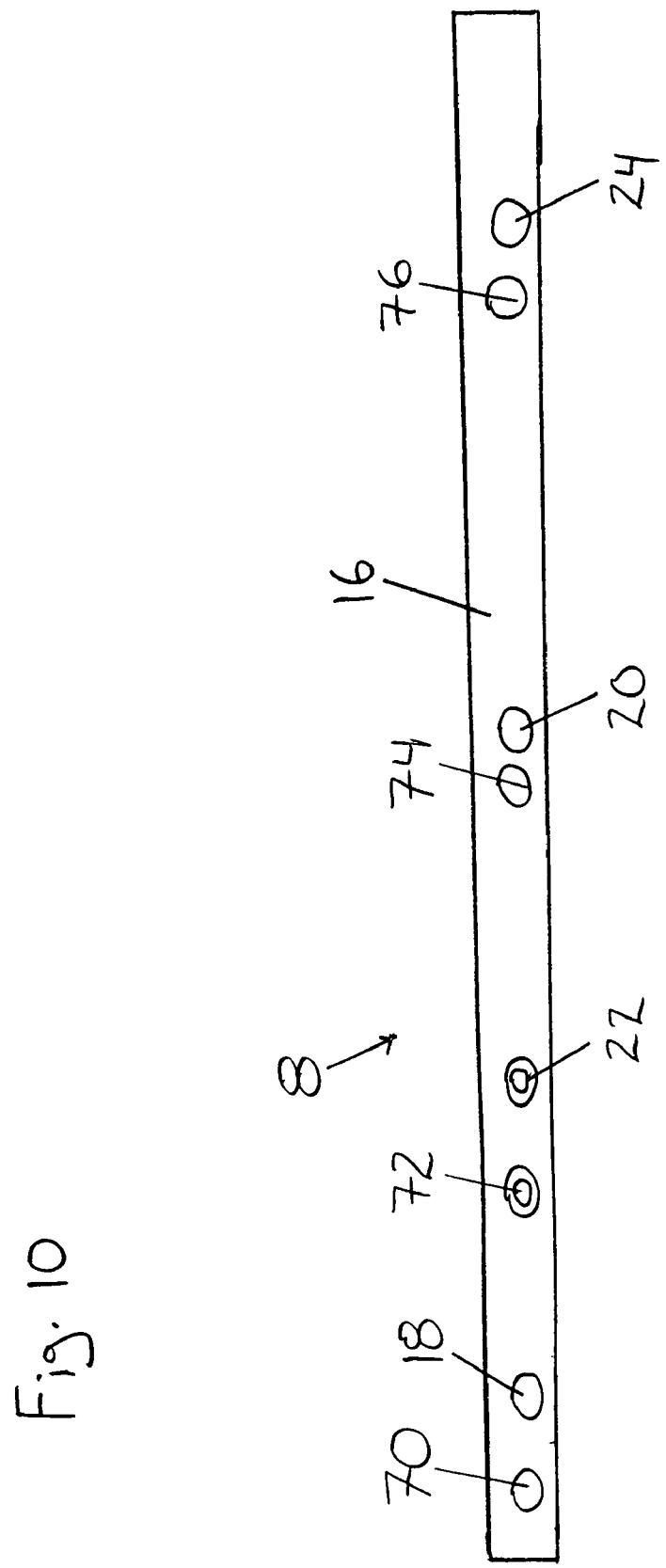

GREASE GUN HANDLE RESTRAINER

CROSS-REFERENCE TO RELATED APPLICATIONS

Priority is hereby claimed to provisional application Ser. No. 60/534,459, filed Jan. 6, 2004, the entire contents of which is incorporated herein.

FIELD OF THE INVENTION

The present invention relates generally to a device for preventing the accidental expulsion of grease from a grease gun, and more specifically to a restrainer for securing a grease gun handle in the closed or flexed position.

DESCRIPTION OF THE PRIOR ART

Grease guns are used to inject grease into hard-to-access areas of automobiles, farm equipment and machinery. Generally, manual grease guns require loading of a grease cartridge into the barrel of the gun, or grease is bulk loaded into the head of the barrel. To eject the grease from the gun, pressure is generated within the barrel by pumping a handle which forces grease out of a tube or hose and into a lubrication compartment.

One problem encountered using a grease gun is that, due to the pressure maintained in the gun, the handle returns to the open, extended position when not in use. When the grease gun is laid aside, stored, or carried the handle is often accidently compressed. This results in unwanted expulsion of grease from the gun. Consequently, nearby tools, the mechanic, or surfaces not meant to be lubricated, are often contaminated by the grease.

Maintaining the handle of the grease gun in the closed position would prevent unwanted grease from being expelled from the gun and ease the job of the mechanic.

SUMMARY OF THE INVENTION

The present invention is directed to a grease gun restrainer comprising a strap having fasteners which secures the handle of a grease gun in the closed, flexed position.

In one preferred version, two mating fastener pairs are fixed to the strap and are each connected to form two loops. A first loop is configured to be snugly secured around the barrel of the grease gun. A second loop is configured to be secured around the handle in the flexed position. The restrainer is configured so that the second loop may be released from the handle so the grease gun may be used. Preferably, the first loop is also releasable so that the strap may be completely removed. The restrainer provides means for securing the grease gun so that the gun may be carried by the handle.

In one version the restrainer has two pairs of snap-fasteners. The fasteners are arranged along the length of the strap, such that the first fastening member mates with the third fastening member and the second with the fourth. The first and third fasteners are spaced so that when connected, the first strap-loop fits (or can be slipped) snugly around the barrel of a grease gun (a standard size grease gun has a barrel approximately 2.25 inches in diameter). The second and fourth fasteners are spaced and oriented so that the handle is held in the closed position when the strap is looped around the handle and the snaps are joined. In another version of the invention, several fasteners are arranged on the strap so that loops of varying sizes may be formed, accommodating a variety of grease gun sizes.

In another version, the restrainer is a strap configured in a permanent loop-on-loop arrangement. The first loop is configured so that it may be slipped around the barrel of the grease gun and the second loop is configured so that it may be slipped around the handle in the closed position. Each loop is set by a rivet, staple or some other permanent fastener.

In an alternate version, the members of a first fastener pair are fixed to the strap each having its mating side on the same side of the strap. The fasteners are attached to the strap a distance from one another that is approximately equivalent to the circumference of a grease gun barrel. A first member of a second mating pair is fixed to the strap between the members of the first fastener pair, having its mating side on the opposite side of the strap. A second member of the second mating pair is fixed to the strap a distance from the first member that is approximately equivalent one and one-half times the circumference of the barrel.

In another version, the grease gun handle restrainer has one pair of fasteners for securing the strap around the barrel of a grease gun. A second set of fasteners (at least two pair) have the male members adjacent one another and fixed between the members of the first fastener pair. The female members are fixed to the strap a distance from the male members that is approximately equivalent one and one-half times the circumference of the barrel. In this version, the handle retaining portion of the strap can be adjusted by mating any one member of the male group with any one member of the female group.

In another version the restrainer is configured for use with a grease gun having a fastener fixed to the barrel. The strap is elongated and rectangular with at least first, second, and third fasteners fixed on the strap in a line. The first fastener and the grease gun barrel fastener are members of a first mating fastener pair and the second fastener and third fastener are members of a second mating fastener pair.

Further advantages, features, and objects of the invention will be apparent from the following detailed description of the invention in conjunction with the associated drawings.

BRIEF DESCRIPTION OF THE DRAWINGS

FIG. 7 is a partial fragmented view of a grease gun showing a grease gun handle clip restrainer.

FIG. 8 is an end view of an alternate version of the grease gun handle restrainer of the present invention having two permanently fixed loops.

FIG. 9 is a top plan view of an adjustable grease gun handle restrainer for use with a grease gun having a snap attached to its barrel.

FIG. 10 top plan view of an adjustable grease gun handle restrainer of FIG. 5 having back-up fasteners.

DETAILED DESCRIPTION OF THE INVENTION

Figure 1:
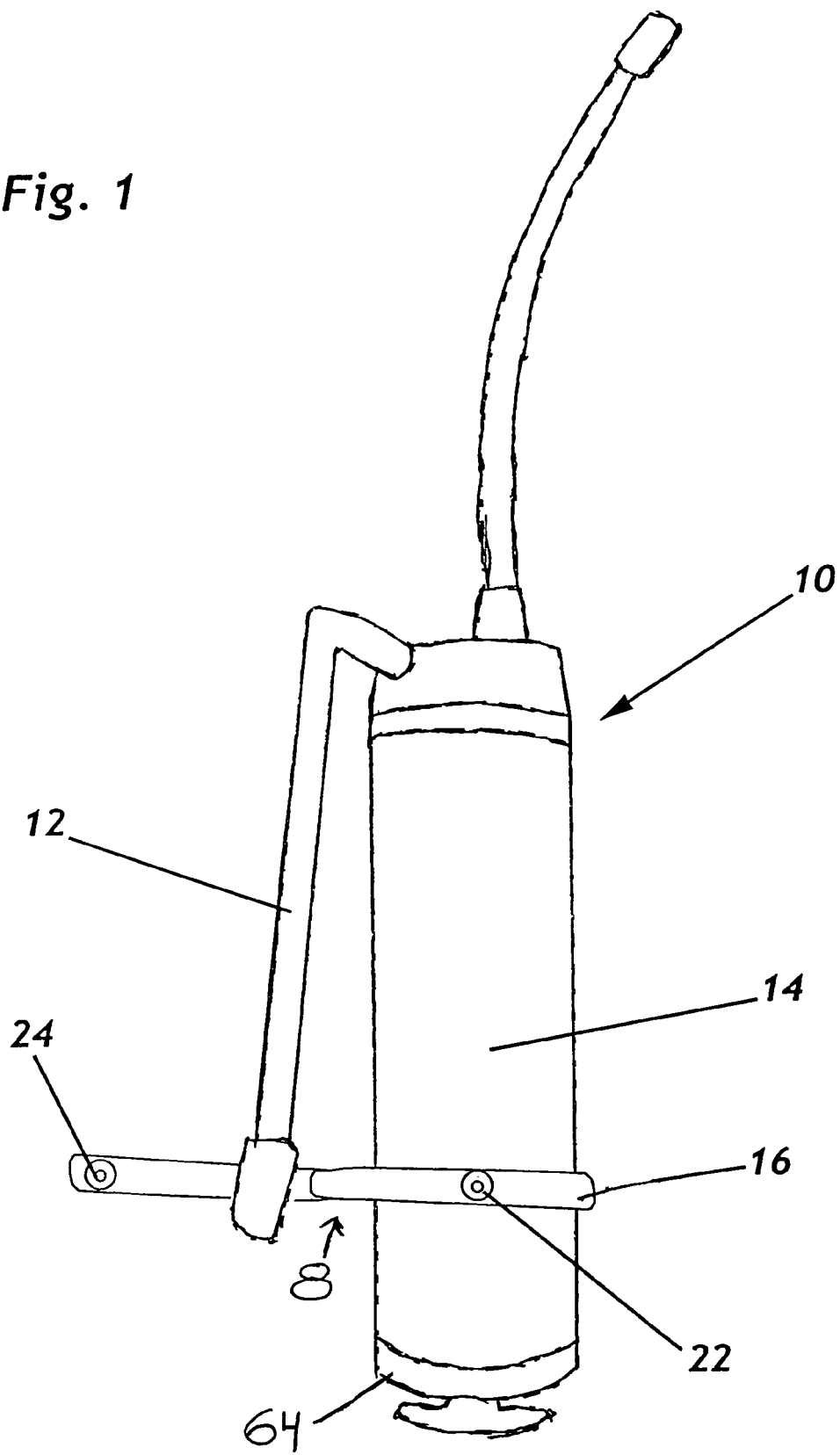
FIG. 1 is a side elevated view of one version of the grease gun handle restrainer secured to the barrel of a grease gun having one pair of fasteners closed.
Figure 2:
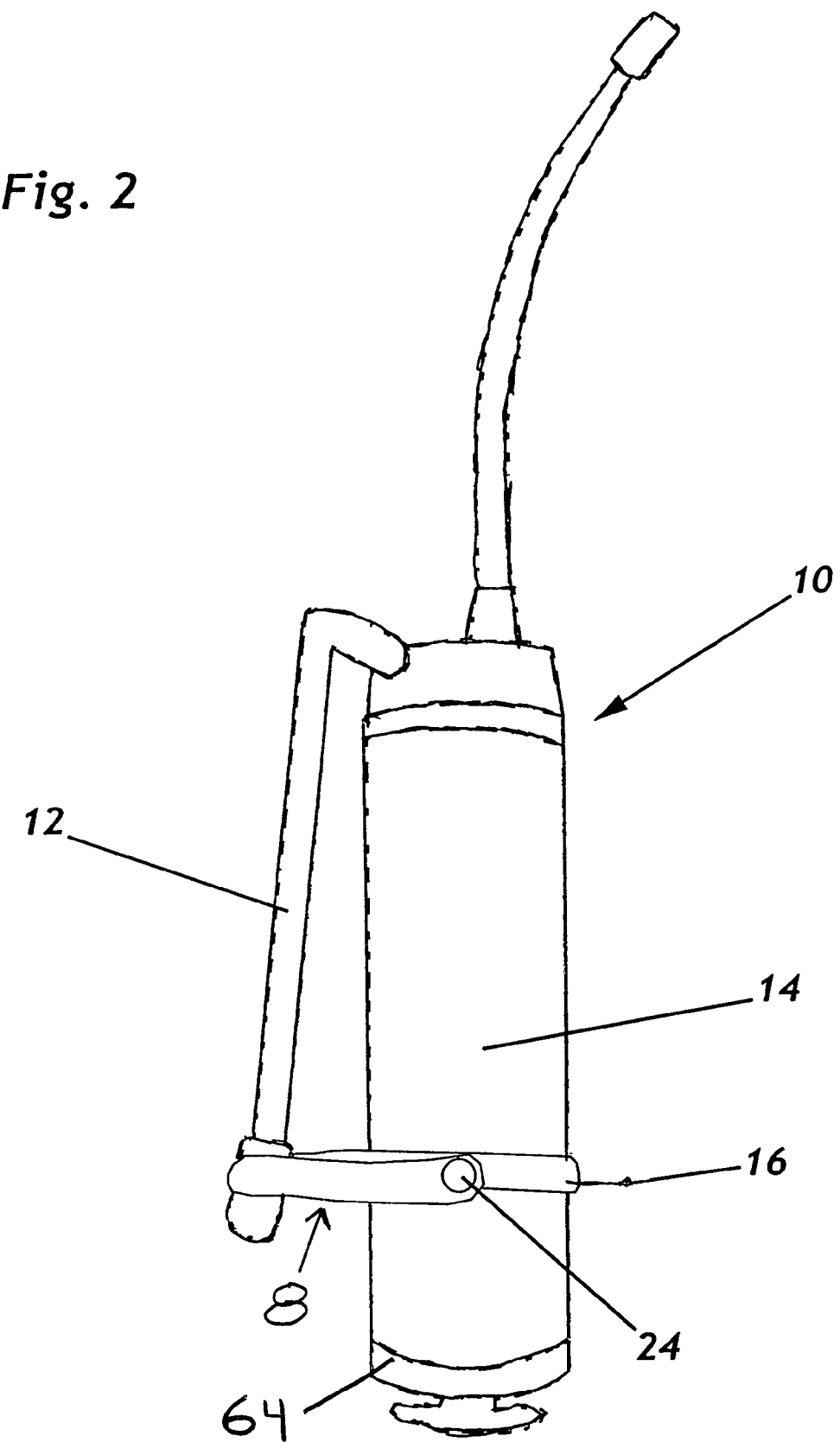
FIG. 2 is a side elevated view of the grease gun restrainer of FIG. 1 having a second pair of fasteners closed and securing the handle in the closed position.

FIG. 1 shows a conventional grease gun 10 having a handle 12 and a barrel 14 with the restrainer 8 of the present invention secured around the barrel 14 of the gun 10. FIG. 2 shows the restrainer 8 secured around the handle, holding the handle 12 in the closed/depressed position.

Figure 3A:
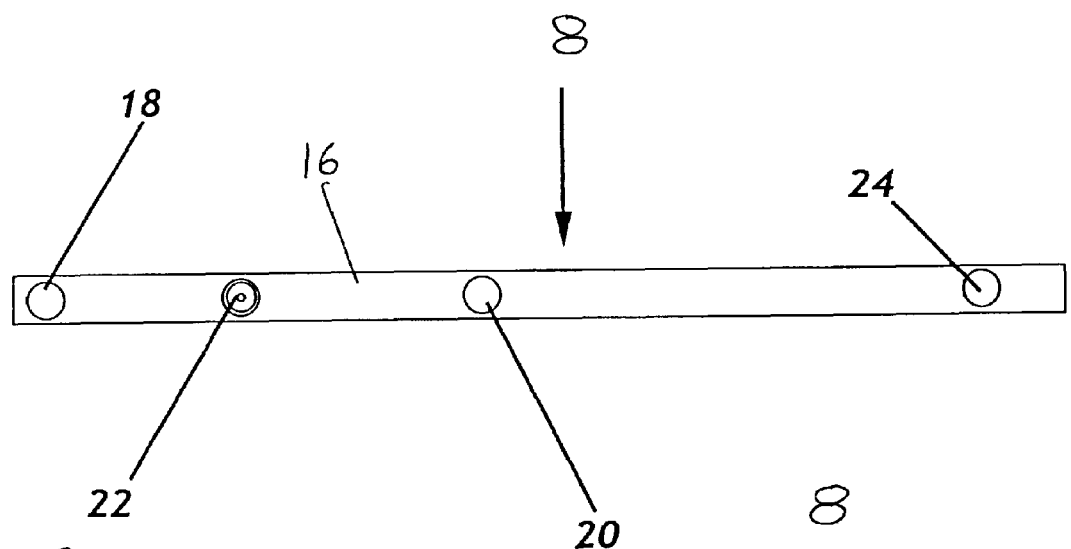
FIG. 3(a) is a top plan view of one version of a grease gun handle restrainer of the present invention.
Figure 3B:
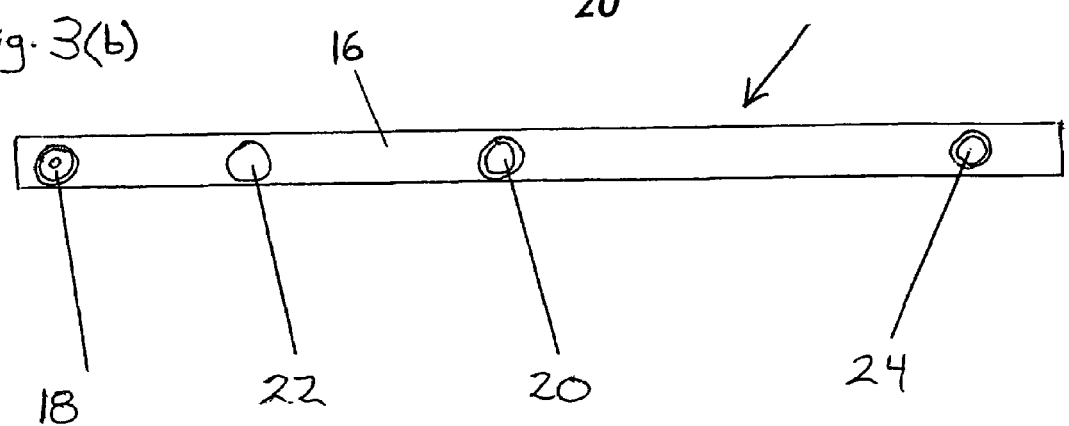
FIG. 3(b) is a bottom plan view of the version of FIG. 3(a).

The restrainer 8 is shown in FIGS. 3(a) and 3(b). Fasteners 18 and 20 are a mating pair and fasteners 22 and 24 are a mating pair. The distance between fastener 18 and fastener 20 is such as to allow the strap to be secured around the barrel 14 of the grease gun 10. Fastener 22 is spaced a distance from fastener 24 so that the handle 12 is held in the closed/depressed position when the fasteners are connected. With reference to the orientation of the fasteners shown in FIG. 3(a), the engaging sides of the fastener pair 18/20 and fastener 24 are on the underside of the strap 16, and the engaging side of fastener 22 is on the top. This construction provides that fastener 18 matingly engages with fastener 20 at 26 (shown in FIG. 4) when the strap 16 is wrapped around the grease gun barrel 14. The remainder of the strap 16 is configured so that it may be wrapped around the handle 12 (when in the closed/depressed position) and allow fastener 24 to engage fastener 22.

Figure 4:
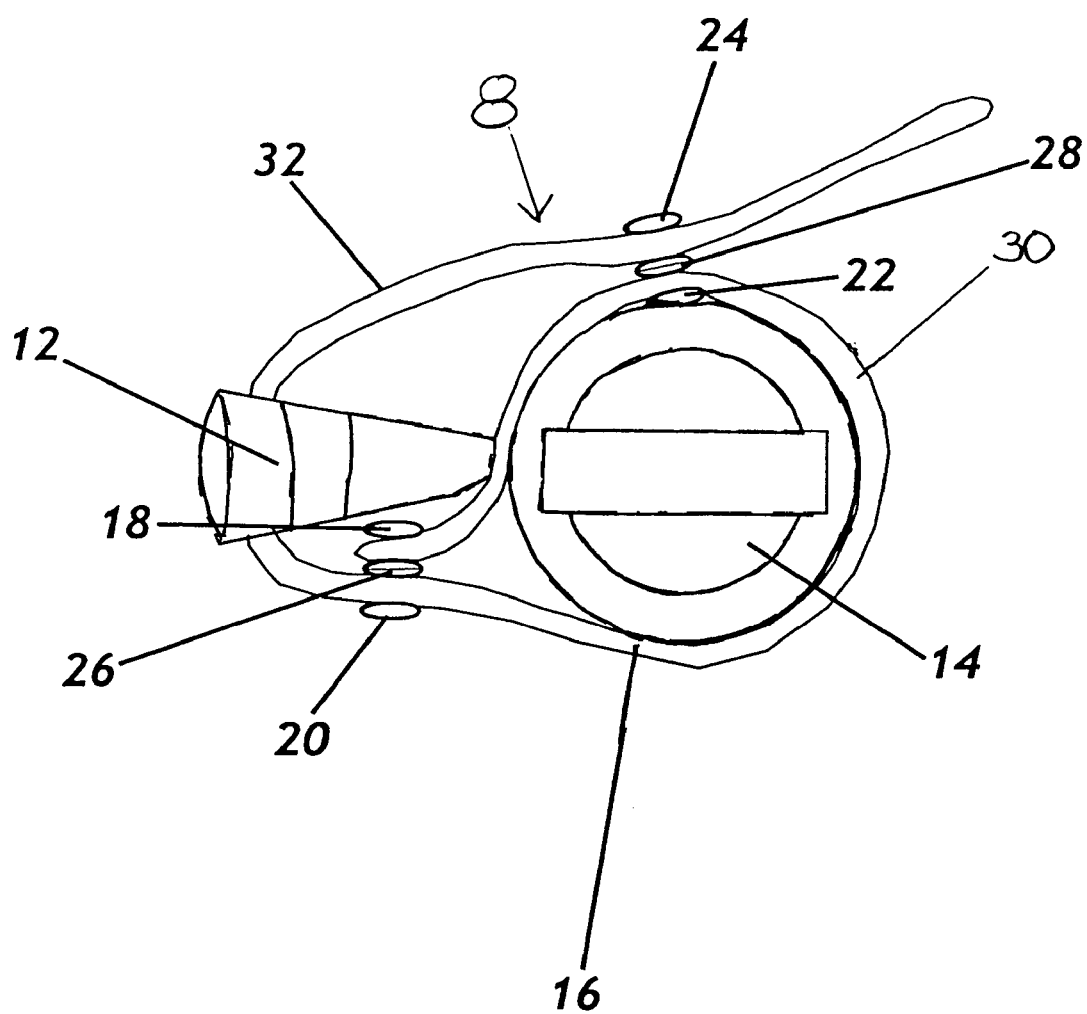
FIG. 4 is an end view of the grease gun handle restrainer shown secured to a grease gun.

FIG. 4 shows the restrainer 8 securely fastened to the barrel 14 of the grease gun 10 by the first pair of fasteners 18 and 20, which are engaged at 26. The handle 12 is secured in the closed position by the second pair of fasteners 22 and 24 engaged at 28. Preferably, fastener pair 18/20 are spaced so that the strap fits snugly and securely around the barrel 14 of the gun 10. An especially snug fit is made if the strap 16 is wetted when the restrainer 8 is fastened to the grease gun 10.

Preferably, the strap 16 is approximately one-half inch wide and one-eighth inch thick, having one-half inch snap fasteners. In the preferred version, for use with a conventional sized grease gun 10, the distance between fasteners 18 and 20 is approximately seven and seven-eighths inches. The distance between fasteners 22 and 24 is approximately eleven and seven-eighths inches. Fastener 18 is inset from one end of the strap 16 by approximately one-half inch and fastener 24 is inset from the other end of the strap 16 by approximately two inches, thereby providing slack so that a user may grasp the strap 16 when securing the handle 12 in place. Preferably, the fastening members 18, 20, 22 and 24 are heavy-duty snaps.

In another version, shown in FIG. 8, fasteners 58(a) and 58(b) fix the strap 16 into two permanent loops. In this version, the strap portions referred to above are riveted, stapled, stitched, or otherwise permanently fixed together. When constructed with permanent fasteners 58(a) and 58(b), the restrainer 8 maintains the loop-on-loop configuration. To secure the handle 12, the first loop 60 is slipped over the end 64 of the barrel 14 and the second loop 62 is slipped over the handle 12.

Figure 5:
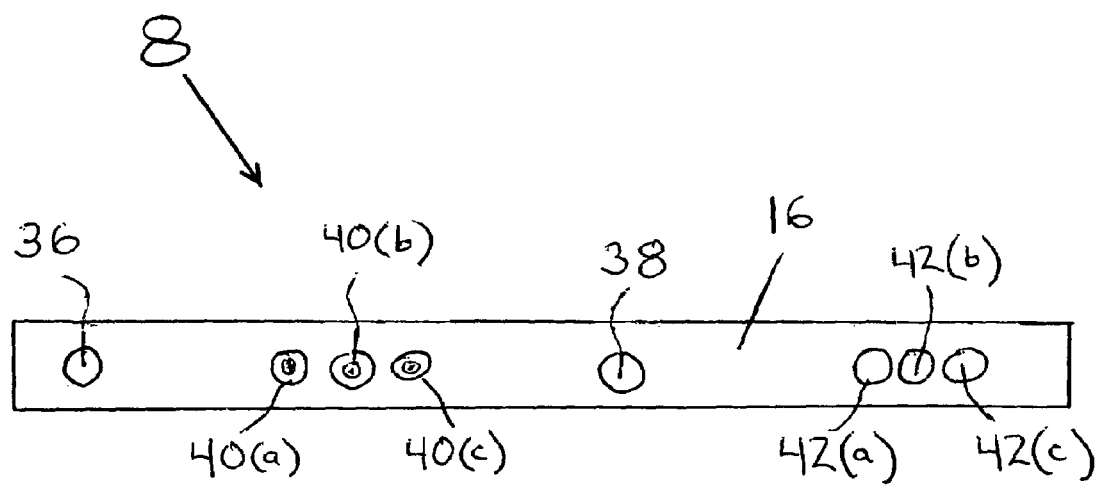
FIG. 5 is a top plan view of an adjustable grease gun handle restrainer
Figure 6:
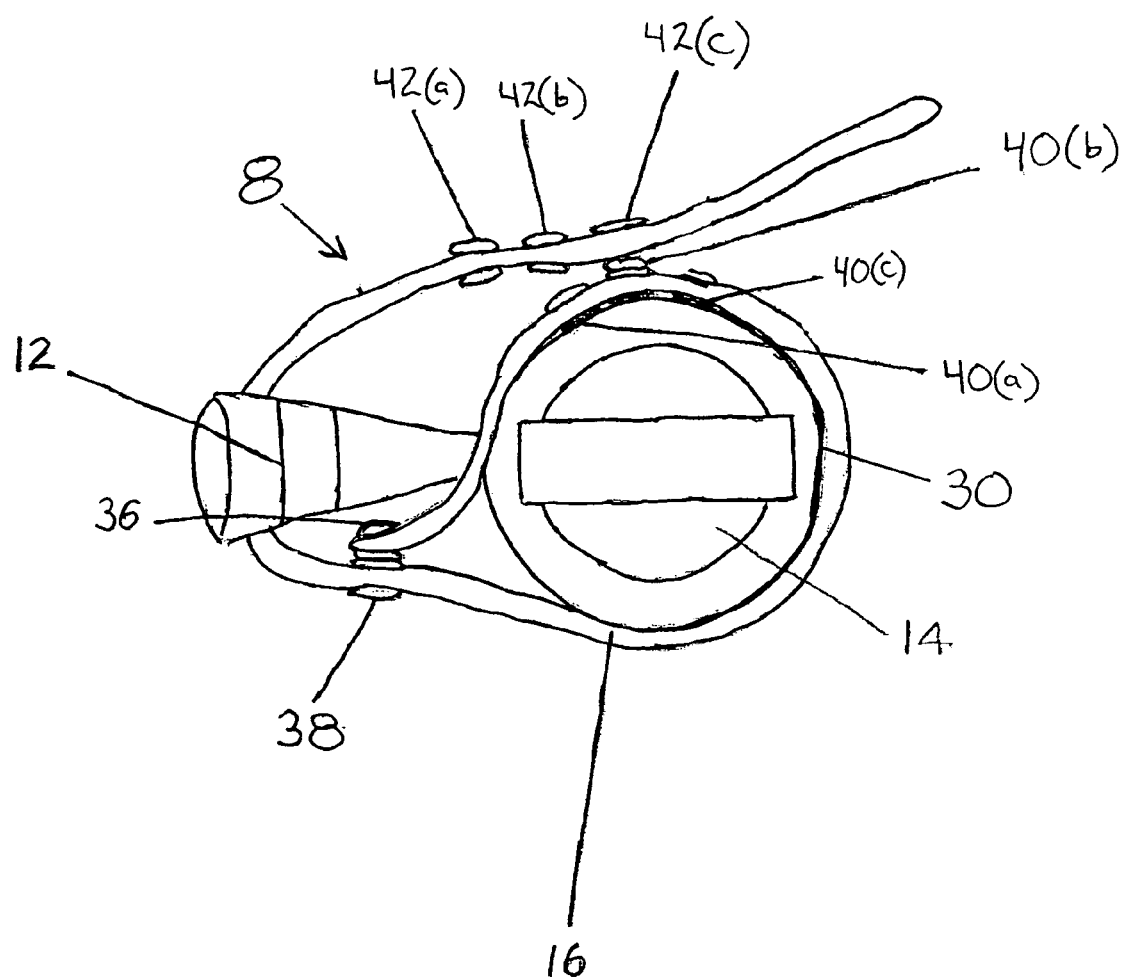
FIG. 6 is an end view of the grease gun handle restrainer of FIG. 5 shown secured to a grease gun.

An adjustable version of the restrainer 8 is shown in FIGS. 5 and 6. In this version, fasteners 36 and 38 mate to secure the strap 16 to the barrel 14. The handle restraining fasteners 40(a), 40(b), 40(c), 42(a), 42(b), and 42(c), provide the restrainer 8 with a plurality of loop sizes for securing the handle 12. Each one of fastener 42(a), 42(b), and 42(c) may be mated with any of opposing fasteners 40(a), 40(b), and 40(c). In the preferred version, each fastener (36, 40(a), 40(b), 40(c), 38, 42(a), 42(b) and 42(c)) is located approximately one-half, two and five-eighths, three and one-quarter, three and seven-eighths, eight and three-eighths, thirteen and seven-eighths, fourteen and one-half, and fifteen and one-eighths inches, respectively, from the end of the strap 54 proximate fastener 36.

FIG. 9 shows an alternate version of the invention for use with a grease gun 10 having a snap attached to its barrel, the strap 16 preferably has three fasteners. The first fastener 64 is a snap for attachment to the snap-fastener (not shown) on the barrel. The second 66 and third fastener 68 are to be mated when the strap 16 is wrapped around the handle 12 in the closed position.

In another alternate version (FIG. 10), back-up fasteners 70, 72, 74, and 76, in addition to the fasteners discussed above, are fixed to the strap 16 and provide a second mating pair to help hold the grease gun handle in the closed position. With this version of the restrainer 8, a user has the option of grasping the handle 12 when in the closed and "locked" position and carry the grease gun 10 with extra assurance that the strap 16 will not accidentally release.

While in a preferred version the restrainer strap 16 is made of leather, it is contemplated that the strap 16 can be made of other durable non-absorbent materials such as plastic or simulated leather. Although the strap is described a having heavy duty snap-button fasteners, other fasteners are also contemplated, such as quarter turn fasteners, pin fasteners, Y-type body snaps (two adjacent snaps at each interval along body of strap), spring clips, hook and loop-type closures (such as VELCRO®-brand closures), or similar matingly-engaging fastening devices. It is noteworthy that a strap made of leather or non-absorbent webbing can easily be wiped clean.

FIG. 7 shows an optional device for securing a grease gun handle 12 in the closed position. A flat metal lever 46 is attached to the grease gun handle 12 so that it may pivot about point 50. The lever 46 has a claw 52 to engage a peg 48 when the handle 12 is in the closed position, thereby locking the handle 12 in that position. To use the grease gun 10, the lever 46 is unclipped from the peg 48.

It is understood that the invention is not confined to the particular construction and arrangement of parts herein illustrated and described, but embraces such modified forms thereof as come within the scope of the following claims. For example, the dimensions are illustrative and may vary according to the size and/or configuration of the grease gun 10.

I claim:

1. A grease gun handle restrainer comprising:
   a substantially rectangular strap having a first side, a second side, a first end and a second end opposite the first end;
   a first pair of mating fasteners fixed to the strap;
   a set of at least three male fasteners fixed to the strap, with each fastener having a mating side on the first side of the strap and fixed between the first pair of mating fasteners; and
   a set of at least three female fasteners fixed to the strap, with each fastener having a mating side on the second side of the strap and fixed between the first pair of mating fasteners and the second end of the rectangular strap.

2. The grease gun handle restrainer of claim 1, wherein the set of at least three male fasteners comprise first, second, and third fasteners and wherein the second fastener is disposed proximate the first fastener and the third fastener is disposed proximate the second fastener.

3. The grease gun handle restrainer of claim 2, wherein the second fastener is disposed approximately five-eighths inch from the first fastener and the third fastener is disposed approximately five-eighths inch from the second fastener.

4. The grease gun handle restrainer of claim 3, wherein each fastener is a fastener selected from the group consisting of snap fasteners, quarter-turn fasteners, pin fasteners, Y-type body snaps, spring clips, D-ring fasteners, and hook and loop-type fasteners.

5. The grease gun handle restrainer of claim 1, wherein the first pair of mating fasteners comprise speedy rivets.

6. The grease gun handle restrainer of claim 1, wherein the strap is comprised of a material from the group consisting of leather, canvas, and soft plastic.

7. The grease gun handle restrainer of claim 5, wherein the male and female fastener set members comprise heavy-duty snap-fastener pairs.

* * * * *